June 10, 1969  HIDEO TAHARA  3,449,481

METHOD FOR MOLDING THERMOPLASTIC PLASTICS

Filed March 14, 1966

INVENTOR
Hideo Tahara
BY
ATTORNEY

United States Patent Office 3,449,481
Patented June 10, 1969

3,449,481
METHOD FOR MOLDING THERMOPLASTIC PLASTICS
Hideo Tahara, 9 Furuishiba 2-chome, Koto-ku, Tokyo, Japan
Filed Mar. 14, 1966, Ser. No. 534,041
Int. Cl. B29c 17/07
U.S. Cl. 264—99                                 3 Claims

ABSTRACT OF THE DISCLOSURE

A method for molding thermoplastic material, comprising the steps of rapidly withdrawing a mold clamping unit which has cut a continuously extruded parison and moving same away from the extrusion passage of the parison immediately after cutting the extruded parison, then effecting hollow molding, and then returning the mold clamping unit to its initial position on the extrusion passage of the parison so as to effect a successive molding.

---

The present invention relates to a method for molding thermoplastic plastics.

It is one object of the present invention to provide a method for molding thermoplastic plastics efficiently and perfectly.

It is another object of the present invention to completely eliminate any possible danger when molded products are removed.

In general, a continuously operating extruding machine, such as a screw-type extruder whereby a continuous extrusion of plastics occurs, may preferably be used to achieve efficient molding of the thermoplastic materials. In this case, however, if balance is lost between the plastic extruding machine and the dies in which the plastic (parison) extruded from the extruder is molded into a desired shape, the parison, which is smoothly extruded, will come into contact with the machine components, such as the dies, before being extruded. The parison then runs out of the fixed line of the process, which in turn will impede the desired optimum performance of the molding process. The uniformity of the products will be spoiled, and an increase in the number of inferior products will result.

It is yet another object of the present invention to provide an improved method for molding thermoplastic materials wherein the parison, which is extruded from the hollow molding machine which interlocks with the mold clamping unit to permit a circular motion, is cut by the dies or a parison cut-off and holding means, and is immediately thereafter rapidly withdrawn from the moving range of the parison; and then, or during the continuation of this withdrawal, the mold clamping unit is moved.

Figure 1:
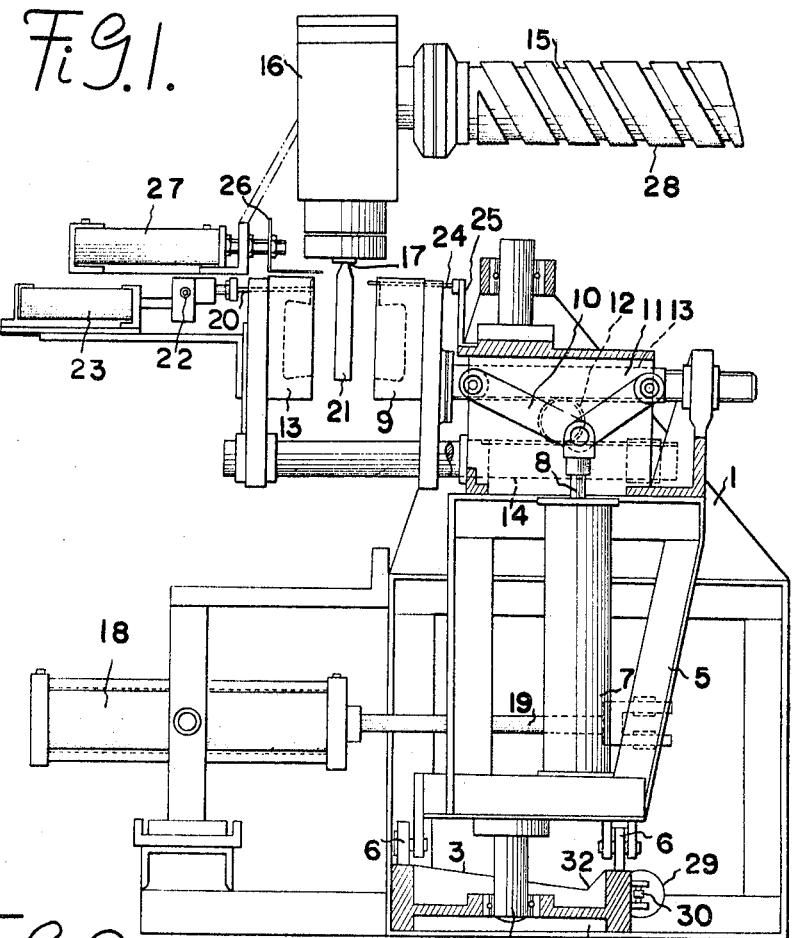
Figure 2:
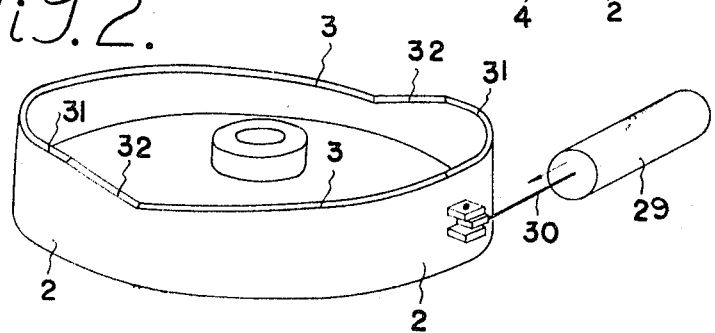

With these and other objects in view, which will become apparent in the following detailed description, the present invention will be clearly understood in connection with the accompanying drawing, in which:

FIGURE 1 is a front elevational view of an apparatus with parts cut away by which the method of the present invention may be practiced, and FIG. 2 is a perspective view of the pedestal of the apparatus.

Referring now to the drawing, a disc-like pedestal 2 is mounted on a base 1. The pedestal 2 is continuously formed with elevated peripheral edges 31 (FIG. 2), sharply inclined edges 32 and slanted edges 3. A central pivoting shaft 4 permits free rotation of a rotating frame 5 with respect to both the base 1 and the pedestal 2. Wheels 6 carried at the bottom of the frame 5 support the frame vertically on the elevated peripheral edges of the pedestal 2.

A hydraulic cylinder 7, mounted on the frame 5, actuates a piston rod 8 for operatively moving dies 9 and 13. When the dies are in a clamped-together position, a plastic (parison) 21, extruded from an extruding machine 15 through an extruding port 17 of a head 16 of the extruding machine, is contained therebetween. The plastic is then molded into the shape of the mold. A connecting rod 10 is operatively connected pivotally between the piston rod 8 and the die 9 whereby the vertical movements of the piston rod 8 are transferred into horizontal movements of the die 9. Racks 11 and 14 are fixed to the dies 9 and 13, respectively; and a pinion 12 is disposed between the racks 11 and 14, engaging both racks to permit movement of the rack 14 in a reverse direction relative to that of the rack 11. This causes the dies to effect a mold clamping movement in which the dies 9 and 13 move together, and a separating movement, in which both dies move apart from each other in mutually interlocked relationship, respectively, upon actuation of the piston rod 8 upwardly and downwardly, respectively. The assembly comprising dies 9 and 13 and the other components, such as the racks 11 and 14, etc., generally called the mold clamping unit. A cylinder 18, operatively mounted to the base 1, actuates a piston rod 19, the latter is pivotally coupled to the rotating frame 5 for rotating the frame 5 through an acute angle.

An air injection needle 20 passes into the parison 21 when the dies 9 and 13 are in the clamped position and tightly enclose therebetween the parison 21, whereby air is blown into the parison 21 from the blast port 22, thereby swelling the parison 21 to obtain a hollow molded product. Another hydraulic cylinder 23 controls the operation of the air injection needle 20, the hydraulic cylinder 23 being mounted at the side of the die 13. A projecting rod 24 facilitates the separating movement of the dies 9 and 13 from their close contacting state and is mounted on an elastic plate 25 fixed to the rotating frame 5. A cutting blade 26 and a hydraulic cylinder 27, which operates the cutting blade 26, is mounted at the side of the head 16 of the extruding machine, the hydraulic cylinder 27 not being connected to the rotating frame 5.

Another hydraulic cylinder 29 (FIG. 2) rotates the pedestal 2 via a piston rod 30. As the dies 9 and 13 clamp the parison 21 therebetween, the piston rod 30 is moved in the direction indicated by the arrow in FIG. 2, causing the pedestal to move clockwise so that the dies 9 and 13, in the clamped state, are abruptly dropped together with the rotating frame 5 from the elevated peripheral edge 31 down along a predetermined range on the sharply slanted edge 32 of the pedestal 2. It should be noted that the dropping condition is not necessarily such that the wheel 6 falls down along the sharply slanted edge 32. It is substantially an instantaneous dropping. Accordingly, the continuously extruded parison 21 is prevented from being contacted by the dies 9 and 13.

A heater 28 is provided for heating the extruding machine 15.

In the method illustrated in the drawing, provision is made in such manner that the dies 9 and 13 start the clamping operation as soon as the parison 21 is cut by the cutting blade 26. However, it may also be arranged so that the cutting blade 26 is attached to the supporting elements of the parison 21, so that the parison 21 remains supported all through the process from the cutting thereof to the completion of the mold clamping, effected some time after the cutting operation. Also, it is not always required to arrange the unit in a longitudinal structure as embodied in the figures; it may also be arranged sideways.

The method of the present invention may be practiced with the apparatus illustrated in the drawing whereupon the piston rod 8 is moved upwardly from its position shown in FIG. 1, so as to cause the dies 9 and 13 to perform a clamping movement, while by a timing means coordinated with the molding operation, the cylinders 29 and 18 thereafter are actuated to rotate the pedestal 2 as indicated above, i.e., clockwise, and the rotating frame 5 in the opposite direction, i.e., counterclockwise, whereby, in accordance with the abrupt dropping of the wheels 6 at the bottom of the rotating frame 5 from the elevated peripheral edge 31 of the pedestal 2 to the sharply inclined slanted edge 32 of the pedestal 2, the dies 9 and 13 which have cut and sealed the parison therebetween, are constrained to fall abruptly in the clamped position, and then, after being further rotated by the cylinder 18 away from the extruder, and then opened by piston 8 at a remote position from the extruding machine, are returned to the initial position shown in FIG. 1 by the reverse operation of the cylinders 18 and 29 to get ready for the next molding operation. Since the falling operation of the dies 9 and 13 is conducted in such manner that the dies are rapidly dropped and withdrawn from the range of movement of the parison 21, which is continuously and smoothly extruded as described above, the continuously extruded parison 21 remains quite free from contact with the machine components, such as dies, thereby eliminating any danger of undesirable deformation of the dies and permitting uniformity of the resulting products.

Moreover, it is possible with the present invention to provide a continuous molding which is quite rational when commercially performing the molding operation. Further, since the removal operation of the molded articles is conducted at a position free from any thermal effects of the extruding machine or the parison, the present invention is also extremely advantageous in terms of safety.

I claim:
1. A method for molding thermoplastic materials, comprising the steps of:
   cutting a parison continuously extruded from an extrusion port,
   clamping said cut parison between split mold dies of a mold clamping unit,
   rotating a rotating frame operatively connected to said mold clamping unit about an axis spaced from and parallel to said extruded parison,
   simultaneously rotating in an opposite direction to the rotating of said rotating frame a pedestal having symmetrically arranged sharply inclined peripheral edges, on which wheels of said rotating frame are mounted, thereby causing said wheels and said rotating frame to abruptly fall on said sharply inclined peripheral edges, whereby said mold clamping unit, which has cut the parison, is rapidly vertically lowered and rotatably withdrawn and moved in the clamped position from said extrusion port,
   effecting molding in said clamped split mold dies,
   opening said split mold dies and removing the molded product, and
   returning said mold clamping unit to its open position at the extrusion port of the parison by reverse rotation of said rotating frame and said pedestal for a successive molding operation.

2. A method for molding thermoplastic materials comprising the steps of:
   cutting a parison extruded from an extrusion port,
   clamping said cut parison at said extrusion port in a split mold die for molding,
   rotating said split mold die while in the clamped position about an axis spaced from and substantially parallel to said extrusion port and simultaneously abruptly linearly displacing said clamped split mold die away from said extrusion port in a direction substantially parallel to said axis,
   effecting molding of said parison in said clamped split mold die,
   opening said split mold die and removing the molded product at a position rotatably and linearly displaced from said extrusion port, and
   returning said opened split mold die to said extrusion port by reverse, rotation about, and linear displacement relative to, said axis.

3. The method, as set forth in claim 2, wherein:
said linearly displacing is vertically downwardly, and said rotating is about a vertical axis.

References Cited

UNITED STATES PATENTS

| | | |
|---|---|---|
| 2,349,176 | 5/1944 | Kopitke. |
| 2,862,232 | 12/1958 | Rekettye. |
| 2,901,769 | 9/1959 | Sherman et al. |
| 2,975,473 | 3/1961 | Hagen et al. |
| 3,235,907 | 2/1966 | Harwood et al. |

OTHER REFERENCES

Jones & Mullen: Blow Molding, copyright 1961, pp. 12, 13, 15 and 16 relied on.

ROBERT F. WHITE, *Primary Examiner.*

T. J. CARVIS, *Assistant Examiner.*

U.S. Cl. X.R.

18—5